United States Patent
Hiltbrunner et al.

(10) Patent No.: US 7,795,541 B2
(45) Date of Patent: Sep. 14, 2010

(54) INSULATING SUPPORT DISC FOR A CONDUCTOR AND ELECTRICAL ASSEMBLY COMPRISING THIS DISC

(75) Inventors: Hugo Hiltbrunner, Vicques (CH); Gerardo Palmieri, Oberentfelden (CH); Karsten Pohlink, Unterentfelden (CH); Christian Tschannen, Unterentfelden (CH); Jean-Luc Bessede, Chateauvillain (FR); Yannick Kieffel, Frontonas (FR)

(73) Assignee: Areva T&D AG, Oberentfelden-Suisse (CH)

( * ) Notice: Subject to any disclaimer, the term of this patent is extended or adjusted under 35 U.S.C. 154(b) by 515 days.

(21) Appl. No.: 11/664,736

(22) PCT Filed: Sep. 28, 2005

(86) PCT No.: PCT/FR2005/050789
§ 371 (c)(1),
(2), (4) Date: Apr. 4, 2007

(87) PCT Pub. No.: WO2006/037914
PCT Pub. Date: Apr. 13, 2006

(65) Prior Publication Data
US 2008/0190650 A1    Aug. 14, 2008

(30) Foreign Application Priority Data
Oct. 4, 2004 (FR) .................................. 04 52245

(51) Int. Cl.
*H02G 5/06* (2006.01)
*H01B 17/56* (2006.01)

(52) U.S. Cl. .................. 174/167; 174/137; 174/152 R; 16/2.1; 16/2.2

(58) Field of Classification Search ............. 174/137 R, 174/650, 167, 153 G, 152 R, 152 G, 168, 174/135, 140 C, 70 B, 88 B, 28, 142, 73.1, 174/15.6, 176, 212; 16/2.1, 2.2; 361/600, 361/601
See application file for complete search history.

(56) References Cited

U.S. PATENT DOCUMENTS

| 3,906,149 A | | 9/1975 | Hashoff et al. ............... 174/167 |
| 3,949,157 A | | 4/1976 | Billings, Jr. et al. ....... 174/73 R |
| 4,145,565 A | * | 3/1979 | Donon ........................ 174/28 |
| 4,447,671 A | * | 5/1984 | Czech et al. .................. 174/28 |
| 4,591,655 A | * | 5/1986 | Czech et al. .................. 174/28 |
| 4,688,142 A | | 8/1987 | Hjortsberg et al. .......... 361/332 |

(Continued)

FOREIGN PATENT DOCUMENTS

DE    2157388    5/1973

(Continued)

OTHER PUBLICATIONS

International Seach Report, PCT/FR2005/050789, 4 pgs, (Sep. 28, 2005).

*Primary Examiner*—Angel R Estrada
(74) *Attorney, Agent, or Firm*—Nixon Peabody LLP

(57) ABSTRACT

Supports for high or medium voltage electrical conductors (6, 7) at potentials different from the potential of an enclosure (1) are supported by disc-shaped parts (4, 5) made from thermoplastic polyester, for example terephthalate polyethylene. The discs (4 and 5) provide good insulation without largely disturbing the electrical field around the conductors due to their fairly low dielectric constant. They are also compatible with use under $SF_6$ gas.

23 Claims, 4 Drawing Sheets

U.S. PATENT DOCUMENTS

| | | | |
|---|---|---|---|
| 4,818,825 A * | 4/1989 | Ishikawa et al. | 174/28 |
| 6,002,085 A * | 12/1999 | Utsumi et al. | 174/28 |
| 6,118,068 A * | 9/2000 | Kelch et al. | 174/28 |
| 7,052,768 B2 * | 5/2006 | Page et al. | 174/137 R |

FOREIGN PATENT DOCUMENTS

| | | |
|---|---|---|
| DE | 3906553 A1 | 9/1990 |
| DE | 4007335 A1 | 9/1991 |
| EP | 0588359 A2 | 3/1994 |
| EP | 1039609 A1 | 9/2000 |

* cited by examiner

INSULATING SUPPORT DISC FOR A CONDUCTOR AND ELECTRICAL ASSEMBLY COMPRISING THIS DISC

CROSS REFERENCE TO RELATED APPLICATIONS OR PRIORITY CLAIM

This application is a national phase of International Application No. PCT/FR2005/050789 entitled "Conductor Support Insulating Disc And Electrical Assembly Comprising Same", which was filed on Sep. 28, 2005, which was not published in English, and which claims priority of the French Patent Application No. 04 52245 filed Oct. 4, 2004.

One aspect of this invention is an insulating disc used to support an electrical conductor for medium or high voltage electrical equipment, and another aspect is an electrical assembly comprising this disc.

Various high or medium voltage electrical devices are known such as cables or isolating switches, in which a conductor brought to a particular potential must be supported by another portion of the equipment such as an enclosure with a different electrical potential due to the insertion of an insulating element. Different shapes and many different materials have been proposed to create this insulating element. All known solutions have inadequacies and disadvantages. Some materials cannot be machined, consequently insulating supports have to be manufactured using an expensive technique such as moulding; some insulating elements, proposed in prior art, have complex shapes that make their manufacturing even more expensive and complicate their assembly; and finally not all materials are gas tight, which means that they cannot be used when the insulating element is also required to separate two different compartments.

Constant requirements for electrical insulation encountered in this field and for mechanical strength are aggravated for switchgear such as isolating switches for which electrical loads due to successive connections and disconnections are more severe, and that operate at high temperatures of the order of 80° C.; and especially in some particular atmospheres such as sulfur hexafluoride SF6 that electrical arcs that occur in this type of equipment decompose to create corrosive products, including hydrofluorhydric acid that attacks some insulators. This type of equipment is often called GIS (Gas Insulated Switchgear), or gas-tight substations, in engineering.

All these requirements are very difficult to reconcile. Thus, prior art for insulators considered herein includes heterogeneous discs composed of a flaky structure composed of various materials in concentric layers, that provides some electrical properties but is not gas-tight and requires complicated and expensive manufacturing. Mechanical strength and corrosion resistance requirements are not always respected either.

Documents EP 0 588 359 A and DE 39 06 553 A describe epoxy resin or silicone discs. These materials maintain good mechanical strength at high temperature and under a corrosive atmosphere but their manufacturing necessary for moulding is also expensive and introduces surface defects that facilitate the appearance of electrical arcs. Therefore, discs must be covered by a layer that completes insulation or shields that perform the same role, which even further increases the manufacturing cost without them necessarily being corrosion resistant.

Thermoplastic polymers have also been proposed to create insulators: document EP 1 039 609 A thus describes a solid polyethylene or polypropylene insulating disc designed for cables without any switchgear in which corrosion by SF6 decomposition products does not occur in the lack of any switching arcs and in which temperatures lower than in isolating switches and similar active switchgear do not correspondingly reduce the mechanical strength of the insulator.

The invention relates to an insulating device of the type mentioned above, in the shape of a disc, and installed on a part such as an enclosure, while acting as a support for an electrical conductor at a potential different to the potential of the enclosure and that is characterized in that it is made of a thermoplastic polyester. This material has apparently never been used for the insulators involved herein. It has all the characteristics that other materials used in prior art do not have: it can easily be machined starting from a thick board or it can be economically worked by extrusion rather than by moulding, it has a relatively low dielectric constant, it enables gas tight assemblies and resists attack by gases usually used in isolating switch enclosures. Its structure is uniform, free of voids and inclusions, which makes it reliable while eliminating partial discharges and surface tracking often induced by moulding defects in the case of some epoxy resins. Therefore, the disc can be placed on the opening of an enclosure without any particular precaution and without affecting operation of the switchgear by disturbing the electrical field. It can be easily worked starting from a thick board using conventional machining tools and it can be provided with particular arrangements, for example to facilitate its assembly or connection of conductors supported on it.

Polyesters have been known for decades. The fact that they have not been used in this application could be explained by the loss of stiffness of thermoplastic polymers and excess thermal expansion when they are heated, and by their possible sensitivity to attack by hydrofluorhydric acid. In fact, it is found that polyesters remained intact under chemical corrosion encountered in practice, that their thermal expansions were acceptable and that they retained a suitable mechanical strength even at about 80° C.: it is found that the resistance to failure of a polyester envisaged for the invention equal to 85 MPa at 20° C. is still 45 MPa at 80° C., and the modulus of elasticity equal to 3200 MPa at 20° C. is halved at 80° C., which is above the vitreous transition temperature of this material at 75° C. Note that the mechanical characteristics of polyethylene and polypropylene are inadequate for this application. In particular, the modulus of elasticity of polyethylene is of the order of 750 MPa at 20° C. and 1000 MPa for polypropylene, leading to unacceptable thicknesses for electrical switchgear. Furthermore, the linear coefficients of expansion of these materials are approximately twice as high as polyester which makes it difficult to use them in gas-tight applications.

Finally, the resistivity per unit area, the dielectric constant and the dielectric strength of a polyester disc have not been altered by an artificial 1000 h ageing test in an atmosphere containing 0.1% (by volume) of gaseous hydrofluorhydric acid at a pressure of 3.5 bars.

There are several types of thermoplastic polyesters. For example, preferably polyesters with a relative dielectric constant of less than 4.0 will be used (at the considered frequency of the current, for example 50 Hz). Semicrystalline thermoplastic polyesters are preferred. This material may be reinforced by a mineral filler, preferably chosen from among the following materials: silica, alumina, glass balls, glass fibre, mica, talc, silicate type nanofillers, for use above the vitreous transition temperature. One polyester that is particularly favourable in all respects is terephthalate polyethylene (PET-P) for which the chemical structure is $(C_8O_4H_8)_n$. A crystallinity ratio within a range of 25% to 60%, a vitreous transition temperature within the range from 70° C. to 100° C. and a crystalline phase melting temperature within the range 230° C. to 270° C. are typical of the properties of the best PET-P materials for the application. The material is used without lubricant. Electrical equipment often functions at high temperatures. Precautions have to be taken against the consequences of the relatively high thermal expansion of polymers, particularly to achieve a good seal. In one particular embodiment of the invention, the disc includes peripheral drillings in which metal tubes projecting from the disc are force fitted with a length greater than the thickness of the disc by at least 0.5%. It will be seen how this arrangement helps to maintain the seal even at a high and variable temperature. The disc may also be provided with a metallic ring surrounding the disc and projecting from the disc with a width greater than the disc thickness by at least 0.5%.

A heat shield may also be added to the interface between the electrical conductor and the insulating disc in order to reduce the temperature on the thermoplastic polyester or to increase the allowable temperature on the conductor. The heat shield around the conductor is formed from a material that is stable at high temperature and at low thermal conductivity, and can be chosen from among ceramics, thermosetting resins or high temperature thermoplastics and composite materials, depending on the temperature of the conductor.

The heat shield has a tubular shape and the roughness or the pattern on the outside of the heat shield may be adapted to increase the bond between the heat shield and the disc or to facilitate assembly, for example by screwing, splines, glued connection or other. For example, the heat shield may be dogged or the heat shield and the disc may be assembled by dovetails. The thickness of the heat shield ring varies from 1 mm to 30 mm depending on the temperature of the conductor and the nature of the selected heat shield material, and its length is similar to the thickness of the disc.

If high mechanical stresses are applied to the insulating disc, for example if a high pressure difference is applied across the insulating disc, the connection between the conductor and the insulating disc may be reinforced by the use of a metal insert to make a solid link between the conductor and the insulating element. The metal insert is tubular in shape and the roughness or pattern on the outside of the insert may be adapted to increase the bond between the insert and the disc or to facilitate assembly, for example by screwing, splines, glued connection or other. For example, the metal insert may be dogged, or the metal insert and the disc may be assembled by dovetail. The thickness of the metal insert ring varies from 1 mm to 30 mm depending on the geometry of the selected connection, and its length is approximately equal to the thickness of the disc.

An appropriate varnish may be applied to the surface of the insulating disc in order to increase the resistance of the insulating disc to decomposition products of corrosive gases such as SF6; an approximately 30 μm thick coat of aliphatic polyurethane varnish could be recommended. One example is FARBA V50 that may be applied with a brush or a paint roller, or it may be distributed under pressure and dried for 4 hours.

The electrical assembly containing the insulating discs and the conductor includes conductor electrodes located on the surface of the disc to increase the ignition voltage of partial discharges. It is recommended that a device should be inserted between the electrodes and the disc to increase the distance from the electrodes and to further increase the ignition voltage. The electrodes are supported by a shoulder around the conductor.

The disc may include at least one radial drilling in which a conductor is placed essentially at the same potential as the support part or the ground. This conductor may be an earthing conductor connected directly or through a measurement instrument.

Drillings, grooves, etc., can be formed in the disc due to the good machineability of polyesters.

These aspects of the invention and others will then be described in more detail with reference to the following figures.

Figure 2:
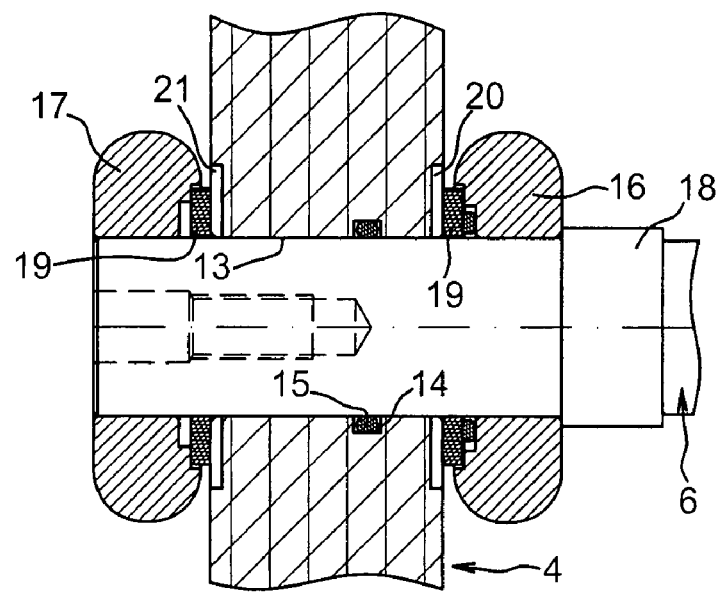
FIGS. 2 and 3 are enlargements of FIG. 1.
Figure 5:
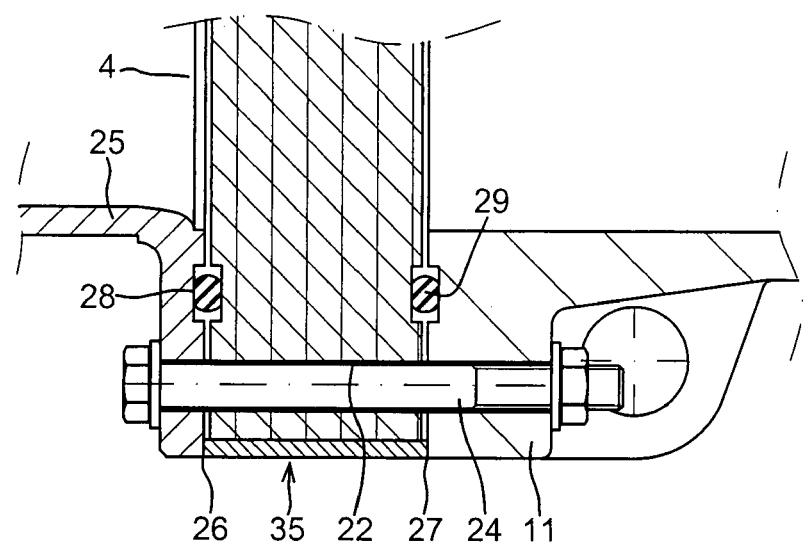
Figure 6:
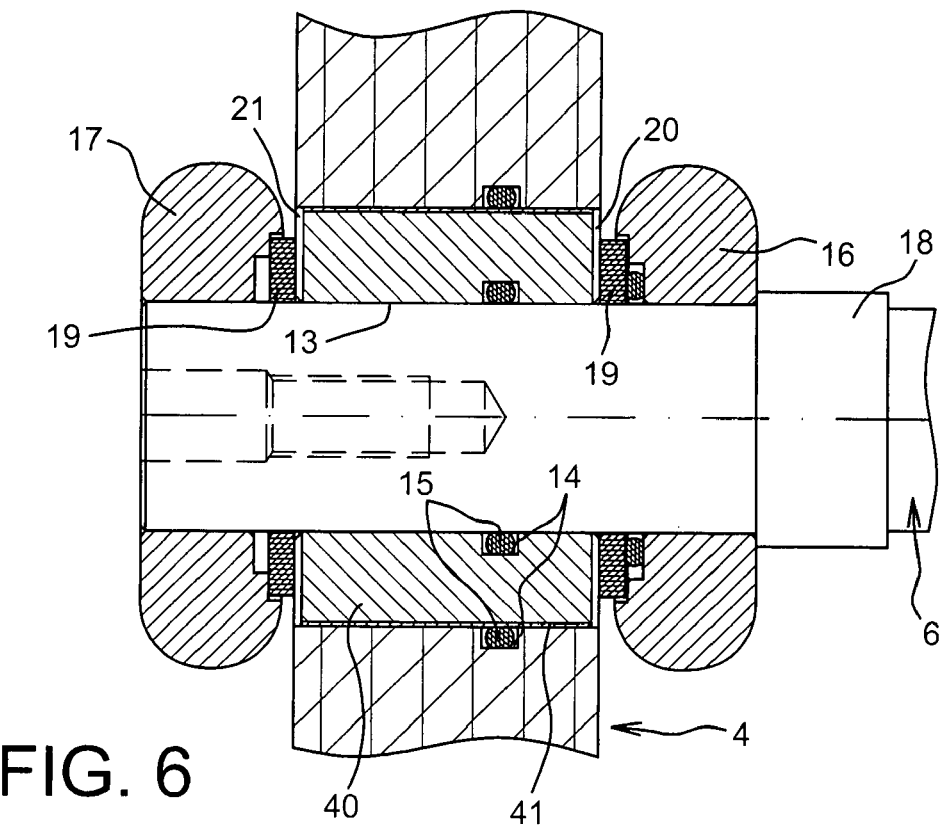

and FIG. 5 shows a variant embodiment of the disc;

and FIG. 6 is a variant of FIG. 2.

Figure 1:
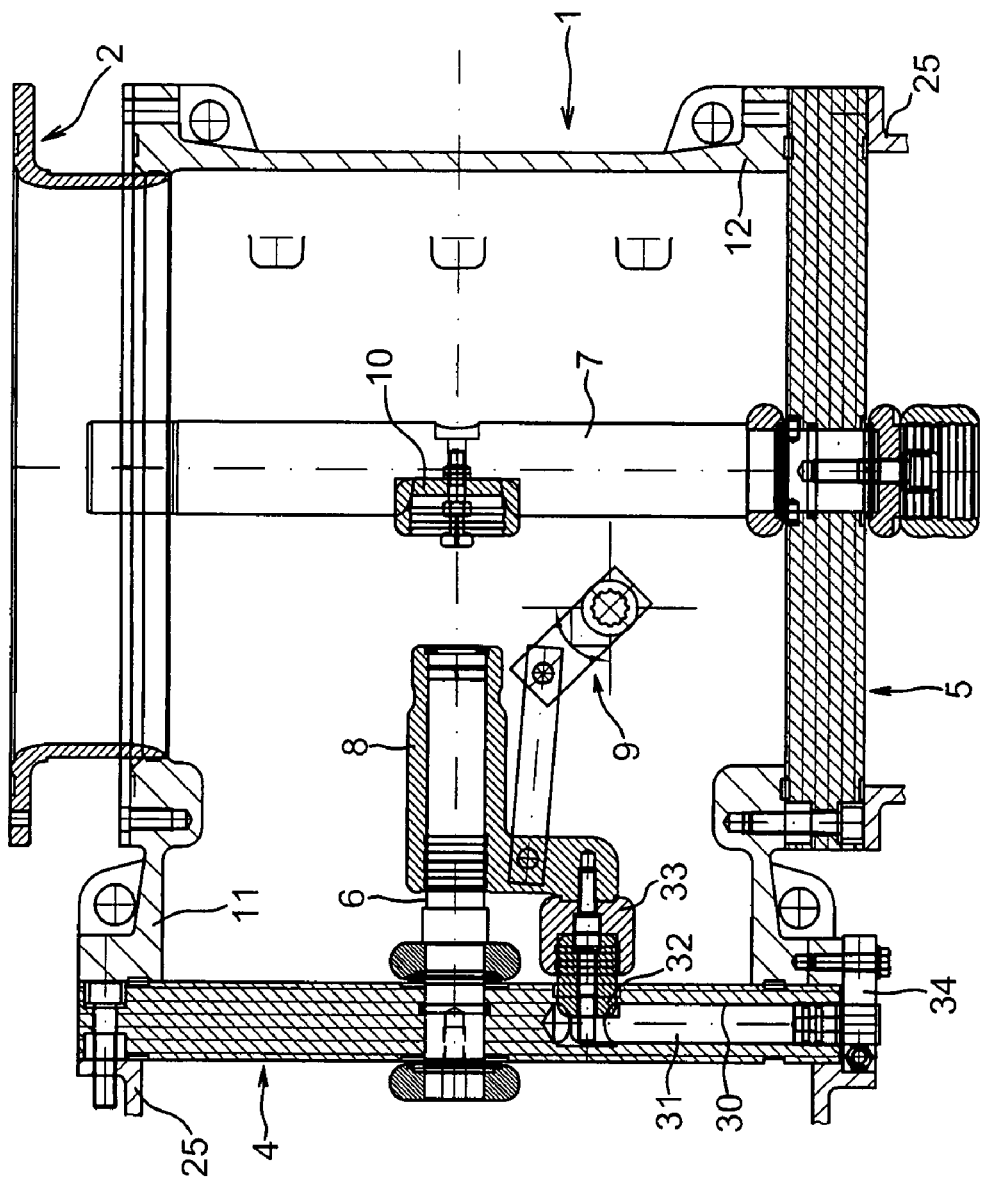
FIG. 1 shows a general view of an electrical isolating switch comprising two discs according to the invention.

We will start by describing FIG. 1 that represents an isolating switch delimited mainly by a gas tight metal enclosure 1, but in which there are openings. An upper opening is delimited by a flange 2 to which either this isolating switch or another device with a disc 5 and a conductor in contact with the conductor 7 (not shown in FIG. 1) is bolted through a sleeve. Two other openings are closed off by discs 4 and 5 conforming with the invention and that support conductors 6 and 7 respectively. The discs 4 and 5 are machined from a polyester block such as a block of terephthalate polyethylene or another polyester, with a relative dielectric constant preferably not exceeding 4.0. The ratio between the diameter-thickness of discs 4 and 5 is preferably less than 10. The conductors 6 and 7 are perpendicular to each other and may be connected through a bushing 8 of an isolating switch, that slides along the end 6 of one of them under the action of an actuation mechanism 9 of which only one end is shown, and that includes levers, connecting rods, springs, etc., according to known practice. It is used to move the bushing 8 forwards until it penetrates into a receptacle 10 associated with the conductor 7, setting up the electrical connection—with the bushing remaining partially slid on the conductor 6—or to create a separation position in which the bushing 8 is withdrawn from the receptacle 10 by pushing it further around the conductor 6. The conductor 6 can then be earthed as will be mentioned later on. The description will now be made for discs 4 and 5 and firstly for disc 4 which has the same details as disc 5, and also other particular details.

The discs 4 and 5 are placed on the plane surfaces of flanges 11 and 12 of enclosure 1 and close off the openings formed by these flanges. The conductors 6 and 7 are engaged in the middle of the discs 4 and 5 so as to pass through them so that if necessary they can be connected to other conductors in the electrical circuit in which the isolating switch is used.

As shown in FIG. 2, an axial drilling 13 containing a segment of the conductor 6 is formed in the disc 4. A groove 14 is formed at mid-thickness of the disc 4 to hold an O-ring 15 to prevent leaks of the particular atmosphere in the enclosure 1. Electrodes 16 and 17 on each side of the disc 4 are slid on the conductor 6. They prevent partial electrical discharges when the potential of the conductor 6 is different from the potential of enclosure 1 that remains at the earth potential. The shape of the electrodes, and particularly the outside radius, is adapted accordingly. The electrode 16 on the inside of the enclosure is placed in contact with a shoulder 18 around the conductor 6. The effect of the electrodes 16 and 17 may be reinforced by stacks of smaller diameter shims 19 placed between each of the electrodes 16 and 17 and the disc 4 and that increase the distance between the disc 4 and the electrodes 16, 17. These stacks of shims 19 are glued or may be free. They are made from the same material as the disc 4. As a variant, electrical discharges may be made more difficult by creating relief on the disc 4 around the radial drilling 13 so as to support the electrodes 16 and 17 moving them further away from the surface of the rest of the disc 4.

In this embodiment, the disc 4 is notched with grooves 20 and 21 on its two faces, radiating around the axial drilling 13. They empty the contents, for example air, from the enclosure 1 and fill it with functional gas, without trapping air between the shims.

Figure 3:
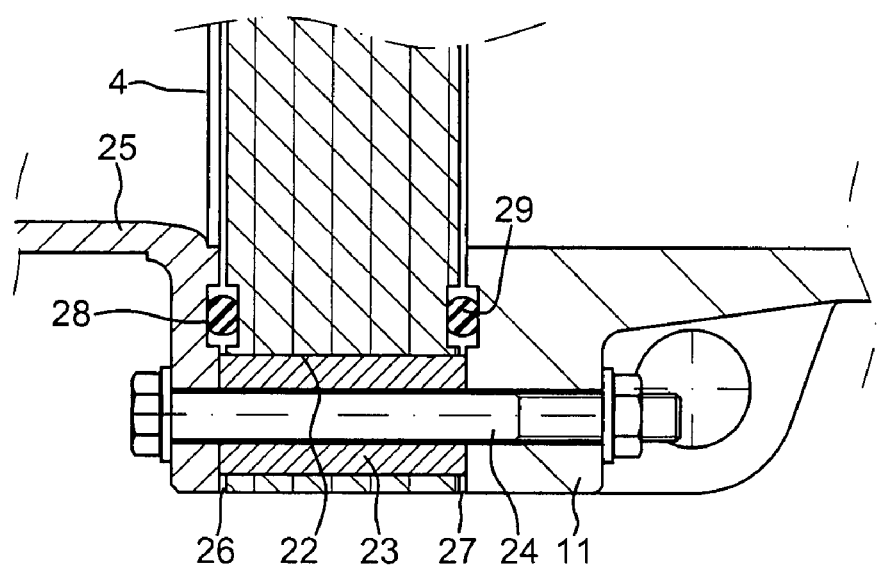

Refer to FIG. 3. One disadvantage of the materials envisaged for disc 4 or 5 is their great coefficient of thermal expansion, which could cause excessive deformations at the high temperatures at which the isolating switch operates. Therefore, a special method of mounting the discs 4 and 5 onto the flanges 11 and 12 is recommended. Peripheral drilling 22 for bolting of the discs 4 and 5 hold the metal tubes 23, for example made from aluminium, slightly longer than the thickness of discs 4 and 5, by at least 0.5%, so that they project on the two faces of the discs 4 and 5. When the bolts 24 are tight, the tubes 23 are held in place on the flanges 11 and 12 and on the flanges such as 25, other elements of the electrical equipment such as ducts or other portions of the enclosure attached to the enclosure 1. There are clearances 26 and 27 between the discs 4 and 5 and the flanges that contain expansions of the disc 4. Gas tightness is maintained by seals 28 and 29 held in grooves formed in the surfaces of the discs 4 and 5 and flanges 11, 12 and 25.

With reference once again to FIG. 1, it can be seen that the disc 4 is distinguished from the disc 5 in that it is provided with radial drillings 30 to house the earthing conductors 31. The conductors 31 finish at buttons 32 projecting from the disc 4 through the inside face facing receptacles 33 of the switch, associated with the bushings 8, and that cover them in the switch earthing position. Other ends of the conductors 31 finish on the connection rods 34 installed around the periphery of the flange 11 and therefore equalize the potential of the conductor 6 and the potential of the earth in the position in FIG. 1. As a variant, instruments are inserted between the conductors 31 and the enclosure 1, for example to measure current in the contacts 33 or to detect partial discharges.

The system with metal tubes 23 to authorize thermal expansion of discs 4 and 5 can be replaced by a metal ring 35 surrounding the discs. This solution is shown in FIG. 5. The width of the metal ring 35 is greater than the thickness of the disc by at least 0.5% and projects on both sides, like the metal tubes 23.

Figure 4:
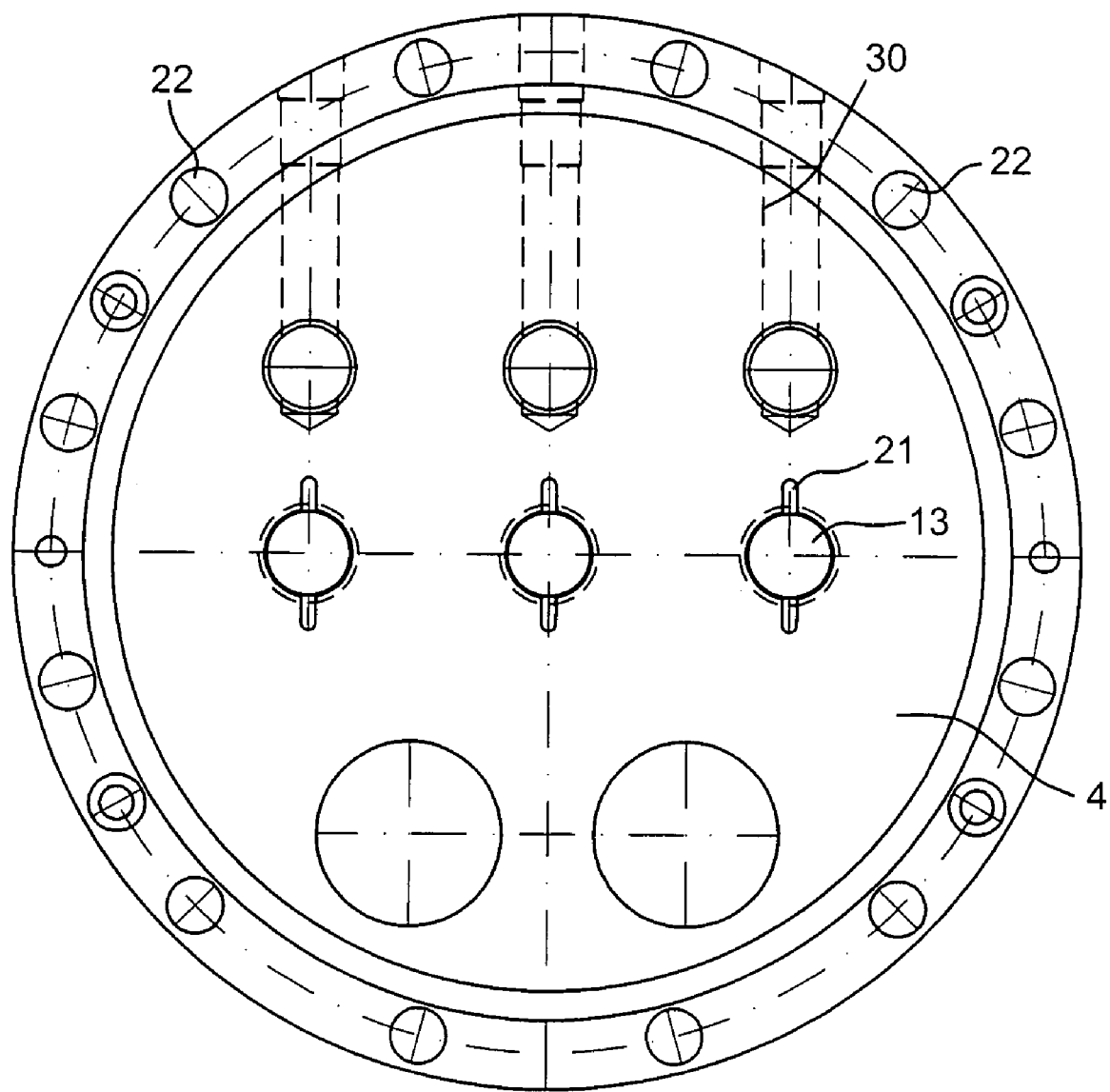
FIG. 4 is a front view of the disc.

FIG. 4 shows that the discs 4 and 5 may support several conductors 6 and 7 that are then placed side by side. The support devices of the conductors comprising axial drillings 13 and electrodes 16 and 17, in particular, are provided for each conductor, with radial earthing drillings 30.

If the discs 4 and 5 do not perform a gas tightness function and only create electrical insulation of the conductors, the seals are not necessary. It is even possible that the discs 4 and 5 are placed between two enclosures containing the same atmosphere. It may then be preferred to set up a communication between these volumes by drilling through discs 4 and 5.

In the variant embodiment in FIG. 6, a metal insert 40 in the form of a bushing is engaged between the conductor 6 and the disc 4, instead of a direct adjustment between them that would be observed in the embodiment in FIGS. 1 and 2. It is used essentially to limit temperature rises of the disc 4. The metal insert 40 is force fitted into the disc 4 at their junction surface 41. The seal 15 in the groove 14 is set up on both sides of the metal insert 40, in contact with the disc 4 and in contact with the conductor 6.

The metal insert 40 could be replaced by a heat shield with the same shape and the same dimensions with a pattern identical to that shown in FIG. 6; the force fitting adjustment would be replaced by bonding at the junction surface 41.

Application of this new material is also advantageous if the insulating disc 5 is not flat. The disc may be conical as it is in many types of existing equipment, it may be provided with relief in the form of concentric circular waves, but it may also be a disc with variable thickness along the radius. This type of non-flat disc may be produced by hot forming.

The invention claimed is:

1. Electricity insulating disc (4, 5) for medium or high voltage electrical equipment made from thermoplastic material, comprising regions assigned to the support of at least one electrical conductor (6, 7) and regions assigned to the support on a part such as an enclosure (1) at a potential different from the potential of the conductor, characterized in that the thermoplastic material is a terephthalate polyethylene polyester having a relative dielectric constant of less than 4.0.

2. Insulating disc according to claim 1, characterized in that the terephthalate polyethylene is semicrystalline, without lubricant, with a crystallinity ratio within a range of 25% to 50%.

3. Insulating disc according to claim 1, characterized in that the terephthalate polyethylene is reinforced by a mineral filler.

4. Insulating disc according to claim 1, characterized in that it is essentially flat.

5. Insulating disc according to claim 4, characterized in that it has a diameter-thickness ratio less than 10.

6. Insulating disc according to claim 1, characterized in that it includes peripheral drillings (22) in which metal tubes (23) projecting from the disc are force fitted with a length greater than a thickness of the disc by at least 0.5%.

7. Insulating disc according to claim 1, characterized in that it is fitted with a metal ring (35) surrounding the disc and projecting from it with a width greater than a thickness of the disc by at least 0.5%.

8. Insulating disc according to claim 3, characterized in that the mineral filler is chosen from among the following materials: silica, alumina, glass balls, glass fibre, mica, talc, silicate type nanofillers.

9. Insulating disc according to claim 1, characterized in that a heat shield or a metal insert (40) is inserted between the disc (4) and the conductor (6).

10. Insulating disc according to claim 1, characterized in that a varnish is applied on it.

11. Insulating disc according to claim 10, characterized in that the varnish is an aliphatic polyurethane.

12. Insulating disc according to claim 1, characterized in that regions assigned to supporting the conductor comprise at least one axial drilling (13).

13. Insulating disc according to claim 1, characterized in that it comprises at least one radial drilling (30) in which a conductor (31) is placed essentially at the same potential as the part (1).

14. A gas tight substation comprising an electricity insulating disc according to claim 1.

15. Insulating disc according to claim 1, wherein the disk is devoid of any coating.

16. Insulating disc according to claim 1, wherein the disk is planar.

17. Insulating disc according to claim 1, wherein the disk is produced by machining or extrusion.

18. Insulating disc according to claim 1, wherein the disk is used in an electric switchgear at about 80° C. and has a vitreous transition temperature between about 70 and 100° C.

19. Electrical assembly for a medium or high voltage electrical equipment comprising an insulating disc and at least one conductor passing through the disc, characterized in that each conductor comprises two ring electrodes (16, 17) close to the disc, and the shape of the electrodes is optimised to eliminate partial discharges.

20. Electrical assembly according to claim 19, characterized in that it comprises shims (19) inserted between the electrode and the disc, and a thickness of the shims is optimized in order to eliminate electrical discharges.

21. Electrical assembly according to claim 19, characterized in that it comprises a mobile switch located at a position where it comes into contact with a portion (32) of the conductor located in the radial drilling, this portion projecting from the disc.

22. Electrical assembly according to claim 19, characterized in that the disc is placed on the opening of the part (1) and is fixed to the part using gas-tight seals (28, 29).

23. A gas tight substation comprising an electrical assembly according to claim 19.

* * * * *